United States Patent [19]

Yamashita

[11] Patent Number: 5,458,173
[45] Date of Patent: Oct. 17, 1995

[54] PNEUMATIC TIRE WITH SPECIFIED TREAD PROFILE AND CIRCUMFERENTIAL GROOVE DEPTH

[75] Inventor: Fumikazu Yamashita, Kobe, Japan

[73] Assignee: Sumitomo Rubber Industries, Ltd., Hyogo, Japan

[21] Appl. No.: 213,746

[22] Filed: Mar. 16, 1994

[30] Foreign Application Priority Data

Mar. 22, 1993 [JP] Japan .................................. 5-087905

[51] Int. Cl.$^6$ .............................. B60C 3/00; B60C 9/18; B60C 11/00
[52] U.S. Cl. ..................... 152/209 R; 152/454; 152/526; 152/531; 152/532; 152/533; 152/538
[58] Field of Search ............................... 152/454, 209 R, 152/209 B, 526, 531–533, 538

[56] References Cited

U.S. PATENT DOCUMENTS 5,000,239  3/1991  Brayer et al. .......................... 152/454 X

FOREIGN PATENT DOCUMENTS 0238679  9/1987  European Pat. Off. .
0412775  2/1991  European Pat. Off. .
1583540  1/1981  United Kingdom .

Primary Examiner—Adrienne C. Johnstone
Attorney, Agent, or Firm—Birch, Stewart, Kolasch & Birch

[57] ABSTRACT

A pneumatic tire, which is improved in high speed durability, maintaining the required tread rubber thickness for mud and snow tires, is disclosed. The tire comprises a radial carcass and a belt including a breaker. The breaker comprises an inner ply and an outer ply, each composed of steel cords laid at an angle of 16 to 26 degrees to the tire equator. The outer breaker ply has a width WB2 of 0.7 to 0.75 times the tire cross sectional width TW. The inner breaker ply has a width WB1 of 1.03 to 1.10 times said width WB2 of the radially outer breaker ply. The tread profile comprises a crown portion defined by a circular arc having a single radius Rc of curvature of 1.4 to 2.6 times the tire cross sectional width TW and having the center on the tire equatorial plane, and a pair of tread shoulder portions continuing from the axially outer ends of said tread crown portion, each defined by a circular arc having a single radius Rs of curvature of 0.10 to 0.20 times the tire cross sectional width TW. The tread rubber thickness Ts at the axially outer edges of the radially outer breaker ply to a tread rubber thickness Tc at the tire equator being 0.7 to 0.9. The tread portion is provided with a block pattern comprising circumferential grooves having a groove depth D of 9 to 13 mm.

4 Claims, 4 Drawing Sheets

PNEUMATIC TIRE WITH SPECIFIED TREAD PROFILE AND CIRCUMFERENTIAL GROOVE DEPTH

The present invention relates to a pneumatic tire, more particularly an improvement in a tread structure for a belted radial tire having a deep groove depth such as a mud and snow tire.

BACKGROUND OF THE INVENTION

Recently, mud and snow tires to be used in, for example, 4 WD (four-wheel-drive) vehicles are required to have an improved high speed durability because such vehicles are greatly improved in their performance and the maximum running speed is increased. For example, there is a great demand for a mud and snow tire being capable of satisfying S-range (ECE30, 180 km/h–20 minutes) or H-range (ECE30, 200 km/h–20 minutes).

It is preferable to decrease the rubber thickness in the shoulder portion of a tire from the point of view of high speed durability. Indeed, this has been originally employed in passenger tires to improve high speed durability.

In the mud and snow tires, however, a relatively deeper groove depth is required in contrast to the passenger tires. In other words, relatively higher blocks are required. And in order to support such blocks, a sufficient thickness is required for the under tread rubber. Thus, it is very difficult to decrease the rubber thickness to improve the high speed durability.

SUMMARY OF THE INVENTION

It is therefore, an object of the present invention to provide a pneumatic tire, the high speed durability of which is improved, maintaining the required tread rubber thickness.

According to one aspect of the present invention, a pneumatic tire comprises a tread portion, a pair of sidewall portions, a pair of axially spaced bead portions with a bead core therein, a radial carcass extending between the bead portions and turned up around the bead cores, and a breaker belt disposed radially outside the carcass and inside the tread portion, the breaker belt comprising a radially inner ply and a radially outer ply, each ply composed of steel cords laid at an angle of 16 to 26 degrees to the tire equator, the width WB2 of the radially outer breaker ply is 0.7 to 0.75 times the tire cross sectional width TW, the width WB1 of the radially inner breaker ply is 1.03 to 1.10 times the width WB2, the tread portion provided with a tread profile comprising, in the tire meridian section, a tread crown portion defined by a circular arc having a single radius Rc of curvature of 1.4 to 2.6 times the tire cross sectional width TW and having the center on the tire equatorial plane, and tread shoulder portions continuing from the axially outer ends of the tread crown portion and each defined by a circular arc having a single radius Rs of curvature of 0.10 to 0.20 times the tire cross sectional width TW, the tread portion provided with a block pattern comprising a circumferential groove having a groove depth D of 9 to 13 mm, and axial grooves extending in a direction crosswise to the circumferential groove, the ratio Ts/Tc of a rubber thickness Ts at the axially outer edges of the breaker to a rubber thickness Tc at the tire equator being 0.7 to 0.9.

BRIEF DESCRIPTION OF THE DRAWINGS

Embodiments of the present invention will now be described in detail in conjunction with the accompanying drawings.

DETAILED DESCRIPTION OF THE INVENTION

Figure 1:
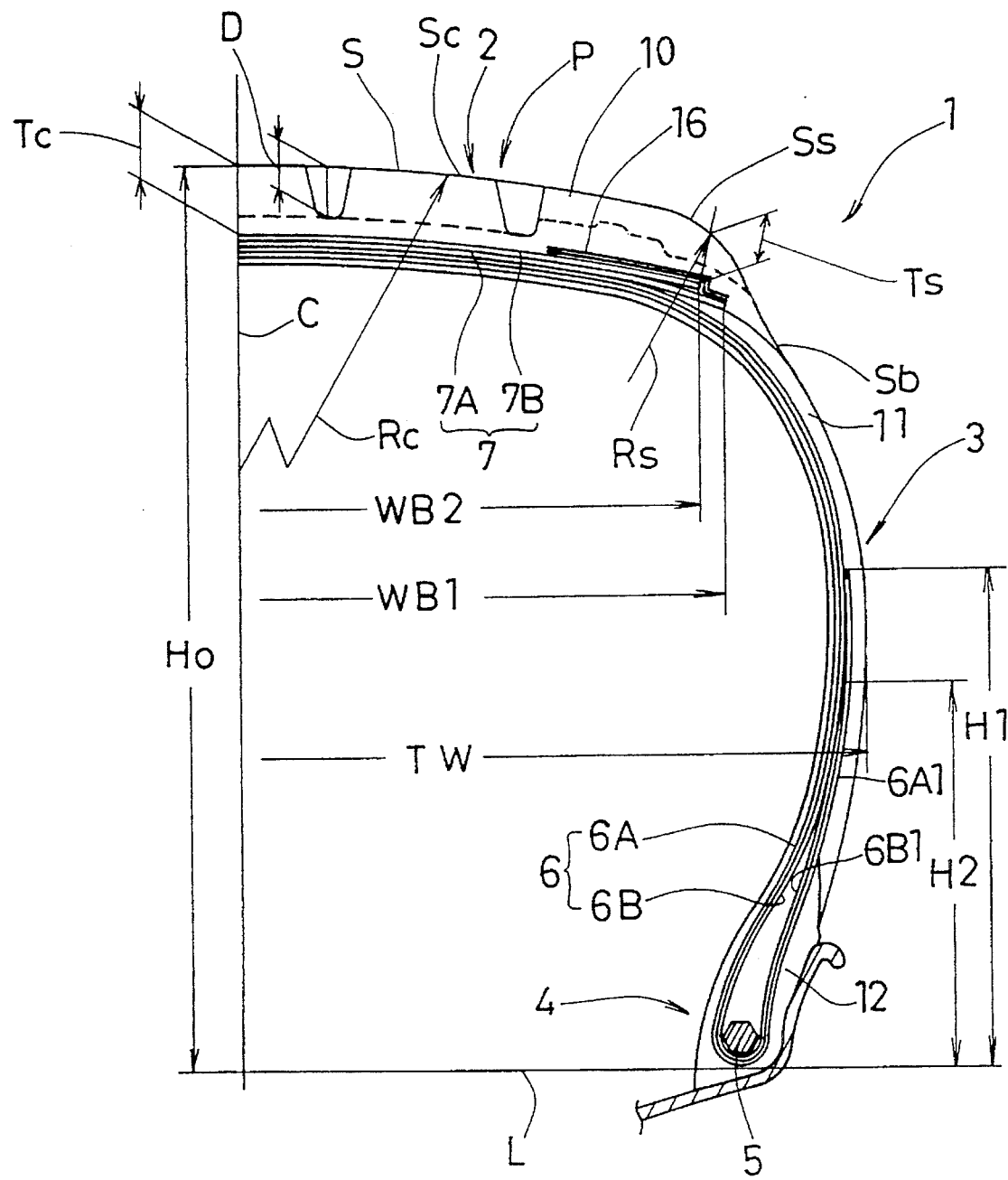
FIG. 1 is a cross sectional view of a tire according to the present invention.

In the figures, a pneumatic tire 1 according to the invention has a tire size 275/70R16 and a block pattern P.

The tire 1 comprises a tread portion 2, a pair of axially spaced bead portions 4, a pair of sidewall portions 3 extending between the tread edges and the bead portions, a bead core 5 disposed in each of the bead portions, a carcass 6 extending between the bead portions, and a belt including a breaker 7 and edge bands 16 disposed radially outside the carcass and inside the tread portion.

The carcass 6 is composed of at least one ply, in this embodiment two plies 6A and 6B, each extending between the bead portions 4 through the tread portion 2 and sidewall portions 3 and turned up around the bead cores 5.

Each of the carcass plies 6A and 6B is made of cords arranged radially at an angle of 80 to 90 degrees with respect to the tire equator C.

For the carcass cords, organic fiber cords, e.g. polyester, nylon, rayon and the like, in this embodiment 1500d/2 polyester cords, are used. The turned up portion 6A1 of the radially inner carcass ply 6A is extended radially outwardly from the bead base and ends near the maximum tire section width point, covering the turned up portion 6B1 of the radially outer carcass ply 6B.

The radial height H1 of the turned up portion 6A1 is 0.45 to 0.65 times, in this embodiment about 0.55 times, the tire section height Ho. The radial height H2 of the turned up portion 6B1 is 0.35 to 0.55 times, in this embodiment about 0.44 times, the tire section height Ho. All the heights are measured from the bead base line L.

The breaker 7 is composed of a radially inner ply 7A disposed radially outside of the carcass 6 and a radially outer ply 7B disposed thereon. To improve the high speed durability, the width WB2 of the radially outer breaker ply 7B is set to be 0.7 to 0.75 times the cross sectional width TW of the tire. The radially inner breaker ply 7A is wider than the radially outer breaker ply 7B, and the inner breaker ply width WB1 is 1.03 to 1.10 times the outer breaker ply width WB2, whereby stress concentration is avoided.

Figure 2:
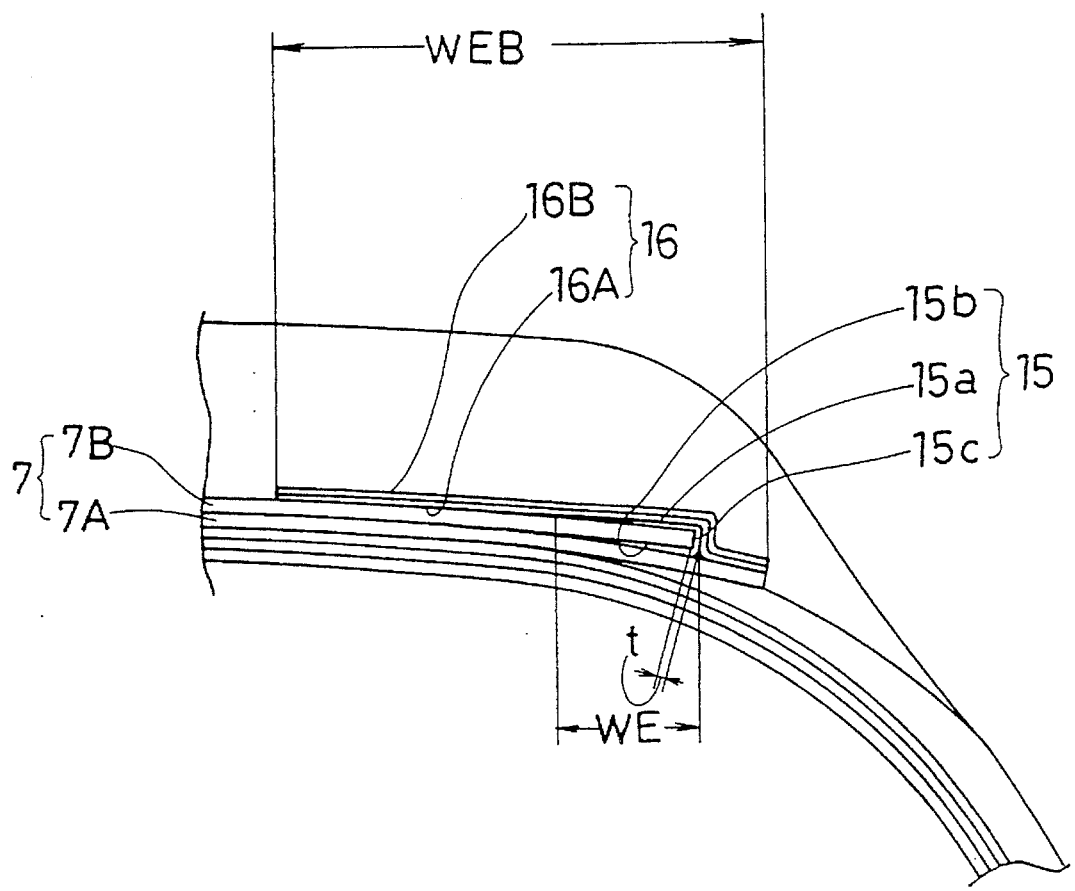
FIG. 2 is an enlarged cross sectional view showing the edge band and rubber edge cover.

In each tread shoulder portion, an edge band 16 and an edge cover 15 are disposed, as shown in FIG. 2, to prevent the axial edges of the breaker plies 7A and 7B from separation failures.

The edge cover 15 is a thin rubber layer having an outer part 15a, an inner part 15b and a lateral part 15c which extends along the radially outer surface, inner surface and edge of the outer breaker ply 7B, respectively, thereby wrapping the edge of the outer breaker ply 7B.

The thickness (t) of the edge cover 15 is 0.3 to 0.7 mm in the lateral part 15c, and the thickness of the outer and inner parts 15a and 15b is the same as (t) in their axially outer edges but gradually decreased towards the axially inner edges thereof.

The width WE of outer and inner parts of the edge cover 15 is 0.05 to 0.15 times the above-mentioned outer breaker ply width WB2.

Therefore, the stress on the outer breaker ply edge, especially share between the inner and outer breaker plies 7A and 7B can be mitigated by the edge cover 15.

The above-mentioned edge band 16 is composed of two plies 16A and 16B of at least one cord which is spirally wound at an angle of not more than 5 degrees with respect to the tire equator C. In this embodiment, a heat-shrinkable low-modulus organic fiber cord, e.g. nylon and the like is used.

Both the band plies 16A and 16B extend axially inwardly from the substantially same axial position as the edge of the inner breaker ply 7A, along the radially outer surfaces of the inner breaker ply 7A, outer breaker ply 7B and outer part 15a. The axially inner edges thereof are located axially inward of the axially inner edge of the edge cover 15.

The width WEB of the edge band 18 is 0.10 to 0.2 times the above-mentioned outer belt ply width WB2. Therefore, the edge bands provides a tight hooping effect on the breaker, and the breaker plies 7A and 7B are effectively prevented from being lifted or moved during high speed running.

In the tread portion, a tread rubber 10 is disposed radially outside of the belt. In each sidewall portion, a sidewall rubber 11 is disposed axially outside of the carcass. In each bead portion, a clinch rubber 12 is disposed axially outside of the carcass turned portion.

The radially outer and inner edges of the sidewall rubber 11 are tapered, and the outer edge is secured between the axially outer edge of the breaker 7 and the carcass 6.

The radially outer edge of the clinch rubber 12 is tapered, and secured between the radially inner edge of the sidewall rubber 11 and the carcass turned up portion.

The above-mentioned tread portion 2 is provided with a profile which consists of a tread crown portion Sc formed by a circular arc having a single radius Rc of curvature and the center on the tire equatorial plane, and a pair of tread shoulder portions Ss, each extending axially outwards continuously from each of the axially outer edges of the tread crown portion, and formed by a circular arc having a single radius Rs of curvature.

Here, the tread profile is defined by the outer surface S of the tread portion 2 in the tire meridian section under a standard state in which the tire is mounted on a regular rim and inflated to a maximum inner pressure but not loaded. The circular arc of the tread shoulder portions Ss is inscribed with the circular arc of the tread crown portion Sc. That is, those arcs intersect each other smoothly without forming a corner.

Further, the circular arc of the tread shoulder portions Ss is circumscribed with the circular arc of a concave buttress Sb or upper sidewall portions.

The radius Rc of curvature is 1.4 to 2.6 times the tire cross sectional width TW. As a result, during running on well-paved roads, the ground pressure distribution becomes uniform across the tread width, and undesirable partial wear and heat-generation can be controlled.

The radius Rs of curvature is 0.10 to 0.20 times the tire cross sectional width TW. If the radius Rs is larger than 0.20 TW, heat-generation increases and high-speed durability decreases. On the other hand, if smaller than 0.10 TW, the structural durability decreases and a belt edge separation failure is liable to occur.

Given that the tread rubber thickness is the distance measured between the tread surface S and the cords of the radially outer breaker ply 7B normally to the outer surface of the radially outer breaker ply 7B, the tread rubber thickness Ts at the axial edges of the radially outer breaker ply 7B is 70 to 90% of the tread rubber thickness Tc at the tire equator C. In the tread crown portion Sc, the tread rubber thickness is constant along the entire width thereof.

Figure 3:
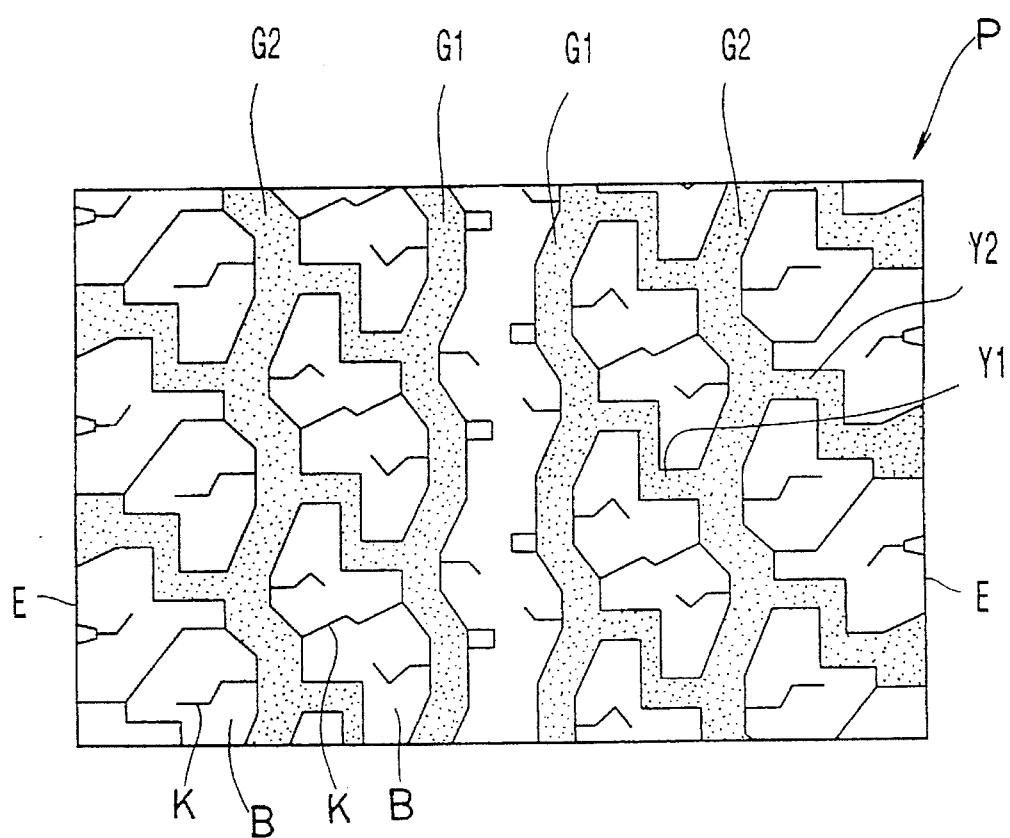
FIG. 3 is a developed view showing a part of an example of the tread pattern.

Further, as shown in FIG. 3, the tread portion 2 is provided with a block pattern P which, in this embodiment, comprises: four circumferential grooves G1 and G2 extending continuously in the circumferential direction of the tire; axial grooves Y1 extending between the circumferential grooves G1 and G2: and axial grooves Y2 extending between the circumferential grooves G2 and the tread edges E.

As a result, one center rib extending continuously in the circumferential direction and four rows of blocks B are formed.

In order to improve grip performance and traction performance on the mud and snow roads, the depth D of the circumferential grooves G1 and G2 is set in the range of from 9 to 13 mm, and the axial grooves Y1 and Y2 have the substantially same depth as the depth D. In this example, the circumferential grooves G1 and G2 and axial grooves Y1 and Y2 are zigzag grooves, but a straight groove may be used.

Further, in this example, each of the blocks B is provided with sipes K (slits or cuts) to improve wet performance.

Test tires of size 275/70R16 having the structure shown in FIG. 1 were prepared and tested for high speed durability and normal durability.

The high speed durability was measured under a normal pressure and a normal load, using a drum, wherein the running speed was increased step by step, and the speed at which the tread portion was broken or cracked was measured as the high speed durability.

The normal durability is evaluation on the structural durability under an accelerated condition (a 150% load, a normal pressure, a relatively low speed of 40 km/h), and it was measured as the running time to any structural failure.

The specifications of the test tires and test results are shown in Table 1, wherein the results are indicated by an index based on that Reference tire 1 is 100, and the larger the value, the better the performance.

It was confirmed that the pneumatic tires according to the present invention can be improved in the high speed durability, maintaining the required tread rubber thickness.

Figure 4:
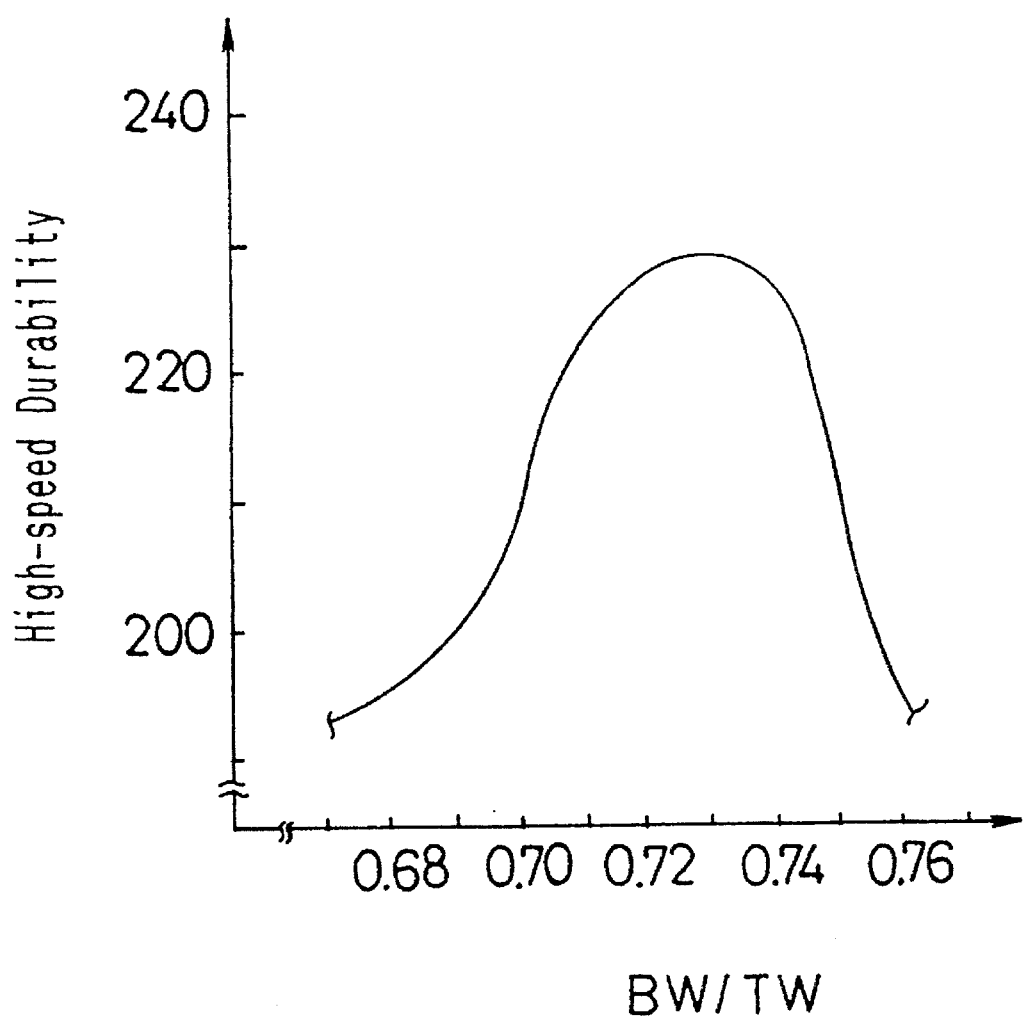
FIG. 4 is a diagram showing a relationship between the high speed durability and BW2/TW ratio.

FIG. 4 shows the high speed durability as a function of the width ratio BW2/TW, wherein the breaker ply width ratio WB1/WB2 was is in the range of 1.03 to 1.10. This graph shows that the durability can be greatly improved by setting the BW2/TW ratio in the range of from 0.7 to 0.75.

TABLE 1

|  | Ex. 1 | Ex. 2 | Ex. 3 | Ex. 4 | Ex. 5 | Ref. 1 | Ref. 2 | Ref. 3 | Ref. 4 | Ref. 5 | Ref. 6 |
| --- | --- | --- | --- | --- | --- | --- | --- | --- | --- | --- | --- |
| Carcass | | | | | | | | | | | |
| No. of plies | 2 | 2 | 2 | 2 | 2 | 2 | 2 | 2 | 2 | 2 | 2 |
| Cord* | PE 1500 d/2 | PE 1500 d/2 | PE 1500 d/2 | PE 1500 d/2 | PE 1500 d/2 | PE 1500 d/2 | PE 1500 d/2 | PE 1500 d/2 | PE 1500 d/2 | PE 1500 d/2 | PE 1500 d/2 |
| Cord angle (deg) | 90 | 90 | 90 | 90 | 90 | 90 | 90 | 90 | 90 | 90 | 90 |
| Belt | | | | | | | | | | | |
| No. of plies | 2 | 2 | 2 | 2 | 2 | 2 | 2 | 2 | 2 | 2 | 2 |
| Cord | steel 1X5/0.25 | steel 1X5/0.25 | steel 1X5/0.25 | steel 1X5/0.25 | steel 1X5/0.25 | steel 1X5/0.25 | steel 1X5/0.25 | steel 1X5/0.25 | steel 1X5/0.25 | steel 1X5/0.25 | steel 1X5/0.25 |
| Cord angle (deg) | 16 | 26 | 26 | 26 | 16 | 16 | 16 | 16 | 16 | 28 | 14 |
| Outer ply width WB2/TW | 0.70 | 0.73 | 0.73 | 0.72 | 0.75 | 0.70 | 0.70 | 0.69 | 0.76 | 0.70 | 0.70 |
| Inner ply width WB1/WB2 | 1.03 | 1.10 | 1.10 | 1.08 | 1.03 | 1.03 | 1.03 | 1.03 | 1.03 | 1.03 | 1.03 |
| Edge band | | | | | | | | | | | |
| No. of plies | 2 | 2 | 2 | — | 2 | 2 | 2 | 2 | 2 | 2 | — |
| Cord | nylon 840 d/2 | nylon 840 d/2 | nylon 840 d/2 | — | nylon 840 d/2 | nylon 840 d/2 | nylon 840 d/2 | nylon 840 d/2 | nylon 840 d/2 | nylon 840 d/2 | — |
| Cord angle (deg) | 5 | 0 | 0 | — | 0 | 0 | 7 | 5 | 5 | 5 | — |
| Width WEB/WB2 | 0.10 | 0.20 | 0.21 | — | 0.20 | 0.20 | 0.20 | 0.20 | 0.20 | 0.20 | — |
| Edge cover | | | | | | | | | | | |
| Width WE/WB2 | 0.05 | 0.13 | — | 0.10 | 0.095 | 0.105 | 0.105 | 0.105 | 0.105 | — | 0.105 |
| Thickness t (mm) | 0.3 | 0.7 | — | 0.5 | 0.5 | 0.5 | 0.5 | 0.5 | 0.5 | — | 0.5 |
| Tread | | | | | | | | | | | |
| Rc/TW | 1.40 | 2.60 | 2.60 | 1.40 | 2.60 | 1.38 | 2.62 | 1.64 | 1.64 | 1.64 | 1.64 |
| Rs/TW | 0.10 | 0.20 | 0.18 | 0.18 | 0.11 | 0.09 | 0.20 | 0.11 | 0.18 | 0.18 | 0.16 |
| Ts/Tc | 0.7 | 0.9 | 0.9 | 0.9 | 0.7 | 0.6 | 1.0 | 0.7 | 0.9 | 0.7 | 0.7 |
| Groove depth D (mm) | 9 | 13 | 10.5 | 10.5 | 10.5 | 10.5 | 13 | 10.5 | 10.5 | 10.5 | 10.5 |
| Durability | | | | | | | | | | | |
| High-speed | 110 | 105 | 105 | 105 | 105 | 100 | 90 | 95 | 92 | 100 | 90 |
| Normal | 110 | 110 | 100 | 110 | 110 | 100 | 100 | 100 | 100 | 90 | 100 |

*PE = polyester

What is claimed is:

1. A pneumatic tire comprising a tread portion, a pair of sidewall portions, a pair of axially spaced bead portions with a bead core therein, a radial carcass extending between the bead portions and turned up around the bead cores, and a belt disposed radially outside the carcass and inside the tread portion, said belt including a breaker belt, said breaker belt comprising a radially inner breaker ply and a radially outer breaker ply, each composed of steel cords laid at an angle of 16 to 26 degrees to the tire equator, said radially outer breaker ply having a width WB2 of 0.7 to 0.75 times the cross sectional width TW of the tire, said radially inner breaker ply having a width WB1 of 1.03 to 1.10 times said width WB2 of the radially outer breaker ply, said tread portion having a tread profile, under a standard state in which the tire is mounted on a regular rim and inflated to a maximum inner pressure but not loaded, including a crown portion defined by a circular arc having a single radius Rc of curvature of 1.4 to 2.6 times the tire cross sectional width TW and having the center on the tire equatorial plane, and tread shoulder portions continuing from the axially outer ends of said tread crown portion, each defined by a circular arc having a single radius Rs of curvature of 0.10 to 0.20 times the tire cross sectional width TW, said tread portion further provided with a block pattern comprising circumferential grooves having a groove depth D of 9 to 13 mm and a plurality of axial grooves extending in a direction crosswise to the circumferential grooves, the ratio Ts/Tc of a tread rubber thickness Ts at the axially outer edges of the radially outer breaker ply to a tread rubber thickness Tc at the tire equator being 0.7 to 0.9, each thickness Ts and Tc being measured from the tread surface to the cords of said radially outer breaker ply normally to a radially outer surface of said radially outer breaker ply.

2. The pneumatic tire according to claim 1, wherein said belt further includes a pair of axially spaced edge bands covering the radially outer surface of the axial edge portions of the radially inner and outer breaker plies, each of the edge bands is composed of at least one organic fiber cord wound spirally around the outside of the breaker at an angle of not more than 5 degrees with respect to the tire equator.

3. The pneumatic tire according to claim 1, wherein each axial edge of the outer breaker ply is covered by an edge cover made of rubber, and the width WE of said edge cover is 0.05 to 0.15 times the width WB2 of the outer breaker ply.

4. The pneumatic tire according to claim 1, wherein said belt further includes a pair of axially spaced edge bands covering the radially outer surface of the axial edge portions of the radially inner and outer breaker plies, each of the edge bands is composed of at least one nylon fiber cord wound spirally around the outside of the breaker at an angle of not more than 5 degrees with respect to the tire equator, and each axial edge of the outer breaker ply is covered by an edge cover made of rubber, the width WE of said edge cover is 0.05 to 0.15 times the width WB2 of the outer breaker ply.

* * * * *